United States Patent

Moffett et al.

Patent Number: 5,319,878
Date of Patent: Jun. 14, 1994

[54] METHOD AND APPARATUS FOR EXTERMINATION OF IMPORTED FIREANTS

[76] Inventors: Daniel Moffett, 3126 Locust Hollow La., Edgewood, Calif. 41017; Robert E. Fitzgerald, 5229 Nob La., Indianapolis, Ind. 46226

[21] Appl. No.: 45,980

[22] Filed: Apr. 9, 1993

[51] Int. Cl.$^5$ .................... A01M 7/00; A01M 13/00; A01M 1/20
[52] U.S. Cl. ........................................ 43/124; 43/132.1
[58] Field of Search ................. 43/124, 132.1, 138, 43/140, 141; 280/839

[56] References Cited

U.S. PATENT DOCUMENTS

| | | | |
|---|---|---|---|
| 1,290,544 | 1/1919 | Graumann | 43/124 |
| 2,906,056 | 9/1959 | Youngblood | 43/124 |
| 4,160,336 | 7/1979 | Query | 43/132.1 |
| 4,756,118 | 7/1988 | Evans | 43/124 |
| 5,054,231 | 10/1991 | Witherspoon | 43/124 |
| 5,109,629 | 5/1992 | King | 43/124 |

Primary Examiner—Kurt C. Rowan
Attorney, Agent, or Firm—Merchant, Gould, Smith, Edell, Welter and Schmidt

[57] ABSTRACT

The extermination of imported fireants is accomplished by a process in which water, heated to a temperature in the range of 200 212° F., is applied by impulse inundation within the central core region of a fireant mound, initiated below ground level, continuing as the probe is inserted to a lowermost region, and thereafter continuing as the probe is withdrawn, and repeating the process from different angles and orientations.

7 Claims, 2 Drawing Sheets

METHOD AND APPARATUS FOR EXTERMINATION OF IMPORTED FIREANTS

BACKGROUND OF THE INVENTION

1. Field of the Invention

The present invention relates to the problem of eradication of troublesome colonies of insects, and more particularly, to extermination of the species of imported fireants termed "Solenopsis invicta" and "Solenopsis richteri."

2. Background of the Prior Art

Imported fireants (order Hymenoptera, Family Fomicidae, species "Solenopsis invicta" and "Solenopsis richteri") are extraordinarily aggressive, destructive insects capable of significant environmental damage, as well as inflicting human and animal suffering in the parts of the country which they inhabit. Imported here accidentally from South America sometime before World War II, these terroristic insects have now spread at an alarming rate across some 216,000,000 acres of land in 15 Southern States. They are steadily migrating northward and eastward each year.

These seemingly indestructible insects have been responsible for an estimated 300,000,000 human stings a year, sometimes severe enough to result in death, particularly in young children and the elderly. Fireants show no fear and will savagely attack and kill any ground dwelling insect and have been known to kill animals as large as cows. Farmers have suffered great economic loss as a result of damaged farm equipment, mutilated crops, and lost livestock.

Relying on a phenomenal reproductive capacity, thousands of "worker ants" are born to a "queen" over just a few days. The worker ants then proceed to build large ant mounds with interconnecting tunnels. The mounds may be found in yards, school playgrounds, open fields, and along roadways, often in concentrations as high as 400 mounds per acre. The mounds range in size from a few inches to several feet in diameter, and sometimes extend to below ground depths of up to six feet. Lateral tunnels often radiate outwardly to an average of perhaps 75 feet and a maximum of 130 feet. These tunnels have entrances and exits to and from the surface which the fireants use in their foraging excursions.

Efforts at control have had only limited success. In the past efforts have concentrated mainly on the use of environmentally hazardous chemical pesticides and baits which are not target specific and which have detrimental ecological effects. In addition, chemical control has been limited in achieving lasting success because of the rapid reproduction and replenishment of fireant colonies.

In the patent literature, typical examples of techniques that confront the problem include U.S. Pat. No. 4,756,118, issued Jul. 12, 1988, to Charles W. Evans, II. The Evans patent discloses a high pressure, high temperature vaporizing system and an insertable probe or lance mechanism together with other associated elements. By these means thermal vapors or gases comprising principally insecticides and diluents are injected into the core of a mound while maintaining a high pressure and temperature. The theory is that dispersion of the insecticide gases will carry through the entire mound and a substantial part of the tunnel system, destroy the queen and all fireants with which the gases come in contact. However, this approach not only relies primarily on the killing power of the insecticide, with its attendant expense and ecological after effects, but presents inherent dangers in terms of the ranges of temperature (2210° F.) and pressure (as high as 3000 psi) that are used. The volume of liquid delivered is kept low, because reliance is placed on the spread of the killing gases.

Other patents evidencing the state of the art include U.S. Pat. No. 4,160,336, issued to Query et al. Jul. 10, 1979. This proposes a technique in which a refrigerant and an insecticide are injected as an aerosol into the individual mounds. As with the Evans II patent, the usage of an insertible probe for dispersion of vapors is not an assured method of delivery, since a mound comprises a plurality of interior tunnels and galleries. In addition, if the probe is not fortunately positioned, the flow may be occluded and have very limited or only partial penetration. The same is true of the U.S. Pat. to Turner, No. 4,367,161, issued Jan. 20, 1987. This is a probe system that utilizes pressurized steam injection, employing a probe that is injected vertically downward into the mound within a proprietary doomed shield with a vent opening. The patent suggests that condensation of a portion of the injected steam into very hot water will aid in the extermination of target insects or animals, but it is evident that only a very limited amount of water can be delivered in this manner. The U.S. Pat. to Connelly, No. 4,815,234, issued Mar. 28, 1989 proposes a combination of mechanical destruction of the ant bed, combined with delivery of a stream of high temperature fluid, which might include water, to kill the fireants. However, fireants are extremely sensitive to disturbing influences, and at the onset of danger the ants transport the queen or queens to different areas. Thus, in an area where there is a substantial concentration of ant mounds, such mechanical disruption has a possibility of being ultimately effective only with the first mounds so treated.

It is evident therefore that a need exists for methods and apparatus which can operate effectively to destroy fireant populations using ecologically safe materials of low cost, overcoming the problems that have been encountered by the prior art.

SUMMARY OF THE INVENTION

Methods and apparatus in accordance with the invention employ a high flow liquid delivery system using a double handled, deep penetrating insertible probe for impulse immersion of the core region of a fireant mount. Flow is started with the probe tip below ground level, followed by continued delivery of very hot water as the probe is inserted further and slowly withdrawn until a region of the entire core is inundated and the hot water has penetrated throughout a central region of the mound complex. Additional insertions of the probe are then successively made from different directions, in each instance starting inundation in the core region and continuing during all the probe insertion and withdrawal phases. The killing action is enhanced by employment of a gel-forming constituent that enhances water retention and clogs the tunnels and galleries. Tests conducted using this system and method have shown total destruction of the queens and ant colonies with no discernible side effects.

In a more specific example of a method in accordance with the invention, a lengthy probe is quickly penetrated into the lower depths of the fireant mound, and a supply of very high temperature (200 to 212 degrees F.)

water mixed with a dissolvable gel-forming compound (such as gel foam) is connected into the lower depths of the mound as soon as full penetration is attained. A significantly high volume of water, between 2½ to 3 gallons per minute in a typical example, is injected at all times after the probe reaches below ground levels. After the first injection, the probe is reinserted quickly several times more, the insertions being spaced and angled to allow the greatest degree of side and lateral coverage although converging on the queen's chamber well below ground. The base of the queen's chamber is used to enable the operator to reference this crucial area of the mound and determine the disposition of subsequent probe insertions. In each insertion, high volume delivery of the solution continues as the probe is slowly withdrawn.

Apparatus in accordance with the invention comprises a transportable, self-contained storage and pressure system for the delivery of the required amounts of scalding hot water at sufficient rates, together with any desired added organic materials. This arrangement enables the operator to transport a self-contained unit through a field infested with fireant mounds, and to effect the killing procedure at each mound with minimal disruption of the fireants at other adjacent mounds until attention is turned to them. To this end, a water supply tank and a propane gas tank are mounted on a wheeled cart, which can be towed by a suitable all terrain or utility vehicle. A pump on the cart is energizable to feed water from the tank to a boiler heated by propane, and supply hot water by a substantial length of hose to a nozzle system having double side handles for fast penetration of the ant mound and good accuracy in delivery of the water/gel mixture. The nozzle system also includes a flow control, and a long delivery probe with a hardened tip having terminal apertures for delivery of the hot water solution. With this arrangement, the operator moves into a zone that is adjacent a number of mounds, extends the length of coupling hose and thereafter proceeds with the multiple insertion and withdrawal process for successive individual fireant mounds before moving to another location. Refilling is necessary only after a substantial number of mounds have been treated.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
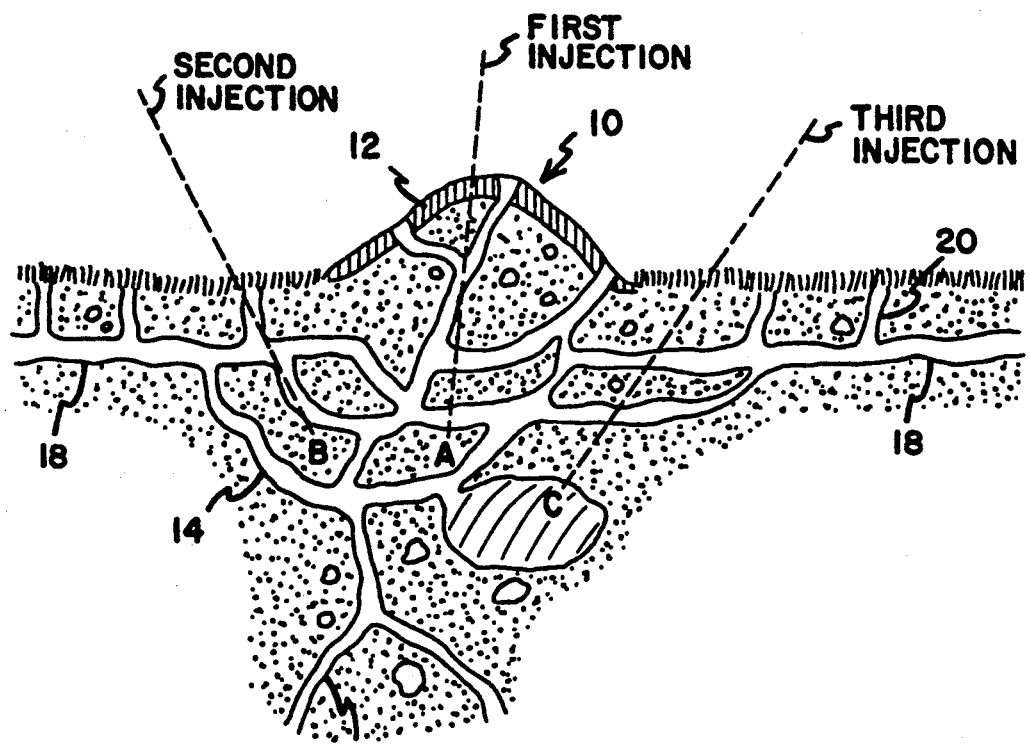
FIG. 1 is a diagrammatic view of a typical fireant mound, showing in phantom a number of different insertion directions and locations for impulse inundation in accordance with the invention.

FIG. 1 is a somewhat simplified and areally limited view of a typical fireant mound, and is a illustrative of the problems faced by one who seeks to effectively exterminate the fireant colony. The visible mound 10 protrudes from 12 to 24 inches above ground, typically being covered with a hard crust 12. However, the visible mound 10 only partially indicates the complex structure underneath, which can extend as much as six feet below ground. The core region of the mound has a complex of tunnels 14 and includes galleries 16 within which the queen or queens may be located. These are invariably deep within the system and are known to be generally centrally located relative to the apex of the mound 10. The lateral foraging tunnels 18 extend radially outwardly and include entrances and exits 20 which lead to and from the surface. Descending tunnels 22 can go from the core region well below ground, to reach the water table.

In accordance with the invention, effective extermination of a fire ant colony is carried out, for each mound 10, by impulse inundation, targeting in each instance toward a lower most insertion point within the mound complex as shown at the points marked A, B, and C for successive insertions. The inundation begins when the probe tip is below ground level, and continues as the probe is forced into the lower most position and slowly withdrawn. Preferably, the water is heated to the range of 200 to 212° F. and is delivered at a rate in the range of 2½ to 3 gallons per minute. Preferably also, the hot water comprises a solution of 10 percent of an organic gel-forming compound, such as gel foam, a seaweed compound. This compound remains in suspension until after it has been heated to near boiling, and then cooled to a lower temperature. At a typical site, the probe is forced rapidly into the mound, first in a substantially vertical direction into the central region, A, close to the queen's chamber, which is deep within the core of the mound interior. The force that must be used is within the capability of a single operator because the mound 10 is not impermeable due to the channels 14 and galleries 16 therein. With rapid insertion, flow is started almost immediately after the probe passes ground level, and is continued until the probe reaches the target area A. This impulse inundation of scalding water eases the insertion force, quickly spreads, and prevents escape of the queen. The probe is then withdrawn slowly over a period of approximately 60 to 90 seconds, with water injection continuing at the rate of 2½ to 3 gallons per minute.

Immediately upon withdrawal from the first target area, another insertion is made at a lower region of the core, as shown at the left hand side, target area B, and the impulse inundation followed by slow withdrawal is again repeated. The procedure is again repeated again for a third angle of attack, as shown in FIG. 1, and several more probe insertions may be utilized if desired. From two to six insertions is adequate for the range of mound sizes generally encountered. This insertion at more than one location and by angled penetration greatly extends the kill field and insures extended tunnel destruction. As the hot water cools, the gelling action takes place, filling some of the tunnels and galleries and coating the walls of others, to render the core region inhabitable to the fireants as well as aiding in the killing action. The temperature of the water is such that there is some evaporation as steam, and because of the volume of water the migration of this steam through the tunnels aids in dispersion of the killing effect.

Various tests of this method have been conducted, followed by immediate examination of the mound, and then a second examination several days to several weeks later. At each test that was done, the temperature of the water and the flow rates were as specified above. The probe was inserted into the vicinity of the queen's chamber in a substantially vertically downward direction first, followed by two to four additional insertions and like inundation, from different angles, but all targeted at the deep-most portion at or near the queen's chamber. In some examples, only hot water was used, while in others, the organic compound was employed. In all instances, immediate examination of the results indicated substantial eradication of the fireant colony, and subsequent examination from 7 to 14 days later revealed no reestablishment of the colony, assuring that the queen and essentially all of the colony had been eradicated.

Figure 4:
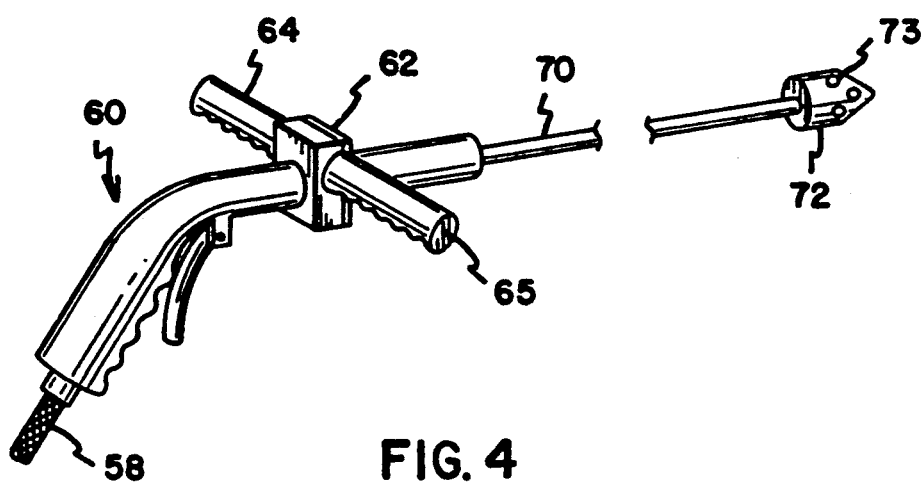
FIG. 4 is a perspective view, partially broken away, of an improved nozzle and probe for use in the system.
Figure 2:
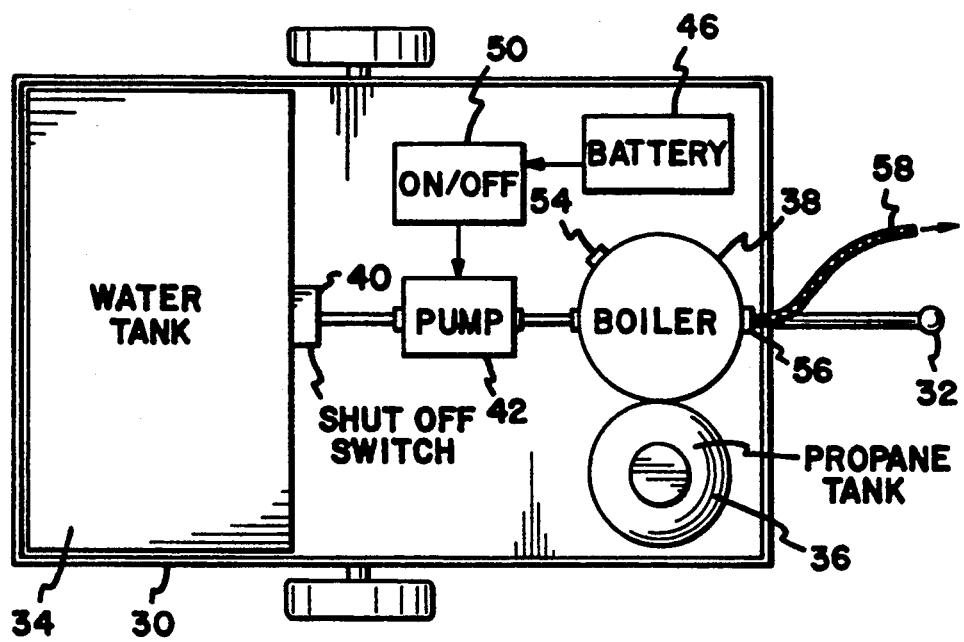
FIG. 2 is a side simplified view of a hot water solution delivery apparatus in accordance with the invention.
Figure 3:
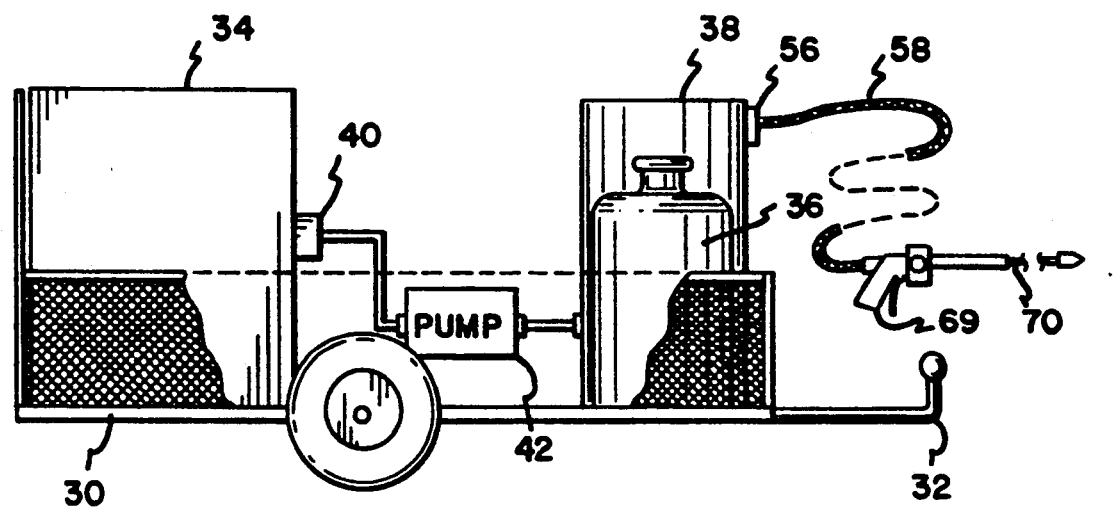
FIG. 3 is a top view of a portion of the apparatus of FIG. 2.

Apparatus for practical use of the method, as shown in FIGS. 2 and 3, comprises a wheeled cart 30 having a forward hitch 32, and having sufficient platform area to support a 50 gallon water supply tank 34, a 30 gallon propane gas tank 36 and hot water boiler 38 in substantially balanced relation, these being the largest and heaviest units of the system. The water tank 34 is preferably of at least 30 gallon capacity and has a shut off switch 40 within a feed line that couples the tank to a pump 42, the pump being energized by a battery 46. A coupling line 50 including an on/off switch (not shown in detail) activates the pump 42 using the battery 46 power. Pressurized water is therefore fed into the boiler 38, which includes a temperature gage 54. An adjustable thermostat 56 at the outlet from the boiler 38 may be set by the operator to set the water temperature in the chosen range. The output from the boiler 38 is fed through a substantial length of high temperature, high pressure hose 58 to a spray nozzle 60 principally of the wash jet type seen in FIG. 4. A bracket 62 mounted on the mid region of the spray nozzle 60 provides an attachment point for two wide handles 64, 65, that are thermally insulated from the spray nozzle 60. In this example, for ease of manipulation, the handles 64, 65 are each 6 inches wide and extend outwardly from the spray nozzle 60. A 60-inch long cylindrical probe 70 having a probe tip 72 with nozzle apertures 73 is attached to the forward end of the spray nozzle 60. The tip 72 is of hardened metal and has a pointed end to permit rapid insertion into the mound without substantial abrasion.

Returning again to FIGS. 2 and 3, the propane gas is fed from the tank 36 by a hose 75 to the boiler 38, maintaining a temperature in the heated compound that is pre-set by the operator at the thermostat 56 setting. The length of hose 58 is typically 20 to 30 feet, so that with the cart 30 in a central location, the operator can dispose of a number of mounds from the central point, with minimum vibration and mechanical agitation of the ground, so as to avoiding alarming the fireant colony. The cart 30 is well balanced, so that it may be wheeled manually from one point to another, if the operator wishes. In the normally infestated field, about sixteen may be serviced from a single location of the cart 30, and several locations may be serviced, depending on mound size, before the water tank 34 must be replenished. In addition, units on the cart are independently powered so that only regular servicing during downtime is needed.

There have been described above and illustrated in the drawings the various forms and modifications in accordance with the invention, it will be appreciated that the invention is not limited thereto but encompasses all alternatives within the scope of the appended claims.

We claim:

1. A method of exterminating fireants comprising the steps of:
   inserting a water conducting probe tip into the core region of the mound;
   inundating the interior region in the vicinity of the probe tip with a flow of water at 200–212° F. at a flow rate in the range of 2½ to 3 gallons per minute;
   continuing the inundation until a target area is reached in a lowermost portion of the mound;
   withdrawing the probe while continuing inundation; and
   repeating the interior inundation by reinserting the probe from two to six times at different angles of insertion.

2. The method as set form in claim 1, wherein initial probe insertion is generally downward through the top of the mound, and the successive probe insertions are at approximately 45° orientations to the vertical and at different angular orientations relative to the mound.

3. The method as set forth in claim 1 above, wherein the injected solution comprises a gel-forming constituent.

4. The method as set forth in claim 3 above, wherein the constituent comprises approximately 10% by weight of gel foam.

5. A system for exterminating fireants by probe injection of hot water, comprising:
   a wheeled cart having a plurality of components mounted in weight balanced relationship thereon, the components comprising:
   water tank means;
   fuel supply means;
   boiler means coupled to be energized by the fuel supply means;
   primary energy storage means;
   waterpump means coupled to receive water from the water tank means and to supply water to the boiler means, the pump means including control means therefor and being coupled to be energized by the primary energy storage means;
   means coupled to the boiler means for varying the temperature of water emitted therefrom; and
   the system further comprising a length of high temperature waterhose coupled to the boiler means and having a length adequate to reach a number of normally dispersed fireant mounts from a central location; and
   water spray nozzle means coupled to the waterhose means.

6. The system as set forth in claim 5 above, wherein the water spray nozzle means comprises wide side handles coupled to the water spray nozzle, an elongated probe having a length in the range of five feet coupled to the spray nozzle, and a hardened tip coupled to the free end of the probe.

7. The systems set forth in claim 6 above, wherein the water tank means has a capacity in excess of about 30 gallons, wherein the primary energy storage means is a battery, wherein the fuel supply means comprises a propane tank.

* * * * *